(12) United States Patent
Keast

(10) Patent No.: US 8,631,882 B1
(45) Date of Patent: Jan. 21, 2014

(54) DRILLING RIG WITH TORQUE MEASURING TOP DRIVE

(76) Inventor: Larry G. Keast, Houston, TX (US)

( * ) Notice: Subject to any disclaimer, the term of this patent is extended or adjusted under 35 U.S.C. 154(b) by 10 days.

(21) Appl. No.: 13/549,150

(22) Filed: Jul. 13, 2012

Related U.S. Application Data

(63) Continuation-in-part of application No. 13/301,520, filed on Nov. 21, 2011.

(60) Provisional application No. 61/420,672, filed on Dec. 7, 2010.

(51) Int. Cl.
*E21B 3/06* (2006.01)
*G01L 3/00* (2006.01)

(52) U.S. Cl.
USPC .... 175/40; 175/203; 73/862.338; 73/862.627

(58) Field of Classification Search
USPC ........... 166/250.01, 380, 77.51, 77.52, 77.53, 166/85.4; 175/40, 203; 73/862.338, 73/862.627, 849, 862.04, 781, 862.044, 73/862.045, 862.474
See application file for complete search history.

(56) References Cited

U.S. PATENT DOCUMENTS

| | | | | |
|---|---|---|---|---|
| 3,695,096 A * | 10/1972 | Kutsay | ............................. | 73/761 |
| 4,165,637 A * | 8/1979 | Kooman | ................. | 73/862.631 |
| 4,176,436 A * | 12/1979 | McCombs et al. | .............. | 29/240 |
| 4,516,646 A * | 5/1985 | Bergfalk | ........................ | 177/211 |
| 4,576,053 A * | 3/1986 | Hatamura | ................ | 73/862.629 |
| 4,715,451 A * | 12/1987 | Bseisu et al. | ..................... | 175/40 |
| 5,144,298 A * | 9/1992 | Henneuse | ................... | 340/854.6 |
| 5,272,925 A * | 12/1993 | Henneuse et al. | ........ | 73/862.541 |
| 6,050,348 A | 4/2000 | Richarson et al. | | |
| 6,918,453 B2 | 7/2005 | Haci et al. | | |
| 6,951,137 B2 * | 10/2005 | Smith et al. | ...................... | 73/761 |
| 7,096,979 B2 | 8/2006 | Haci et al. | | |
| 7,108,081 B2 * | 9/2006 | Boyadjieff | ...................... | 175/40 |
| 7,152,696 B2 | 12/2006 | Jones | | |
| 7,243,735 B2 | 7/2007 | Koederitz et al. | | |
| 7,683,274 B2 * | 3/2010 | Dellac et al. | .................. | 177/211 |
| 7,757,759 B2 * | 7/2010 | Jahn et al. | ................. | 166/250.01 |
| 7,810,584 B2 | 10/2010 | Haci et al. | | |
| 7,921,939 B1 * | 4/2011 | Keast et al. | ..................... | 175/113 |
| 7,984,757 B1 * | 7/2011 | Keast et al. | ..................... | 166/77.1 |
| 8,047,283 B2 * | 11/2011 | Jahn et al. | ................. | 166/250.01 |
| 8,127,836 B1 * | 3/2012 | Keast et al. | ..................... | 166/77.1 |
| 8,281,856 B2 * | 10/2012 | Jahn et al. | ................. | 166/250.01 |
| 2005/0167157 A1 * | 8/2005 | Boyadjieff | ........................ | 175/57 |
| 2008/0125876 A1 * | 5/2008 | Boutwell | ........................ | 700/21 |
| 2008/0202810 A1 * | 8/2008 | Gomez | ............................ | 175/40 |
| 2012/0181083 A1 * | 7/2012 | Fallen | ............................. | 175/40 |

* cited by examiner

*Primary Examiner* — Blake Michener
(74) *Attorney, Agent, or Firm* — Buskop Law Group, PC; Wendy Buskop

(57) ABSTRACT

A drilling rig with a top drive having a torque measuring load cell made from a strain gauged bending pin. When the unit torques up, the bending pin can be arranged to bend slightly in proportion to torque, and a strain gauge on the bending pin provides measurement that can be calibrated electronically in foot-lbs of torque.

11 Claims, 10 Drawing Sheets

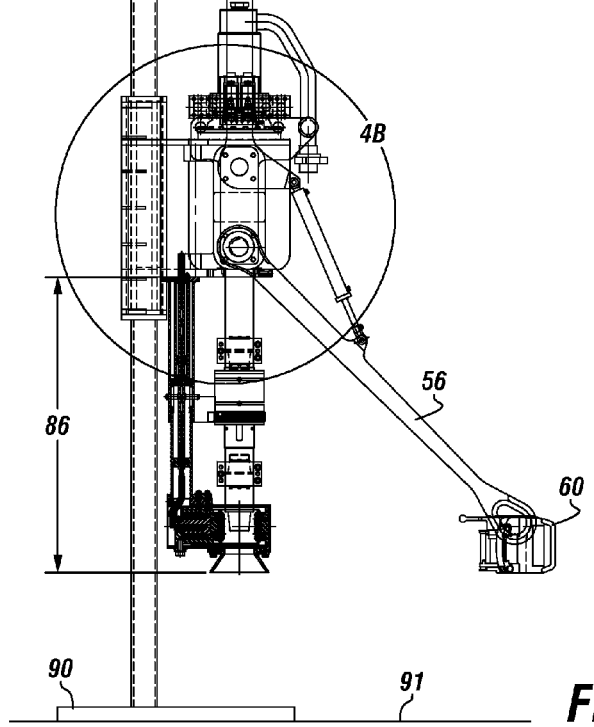
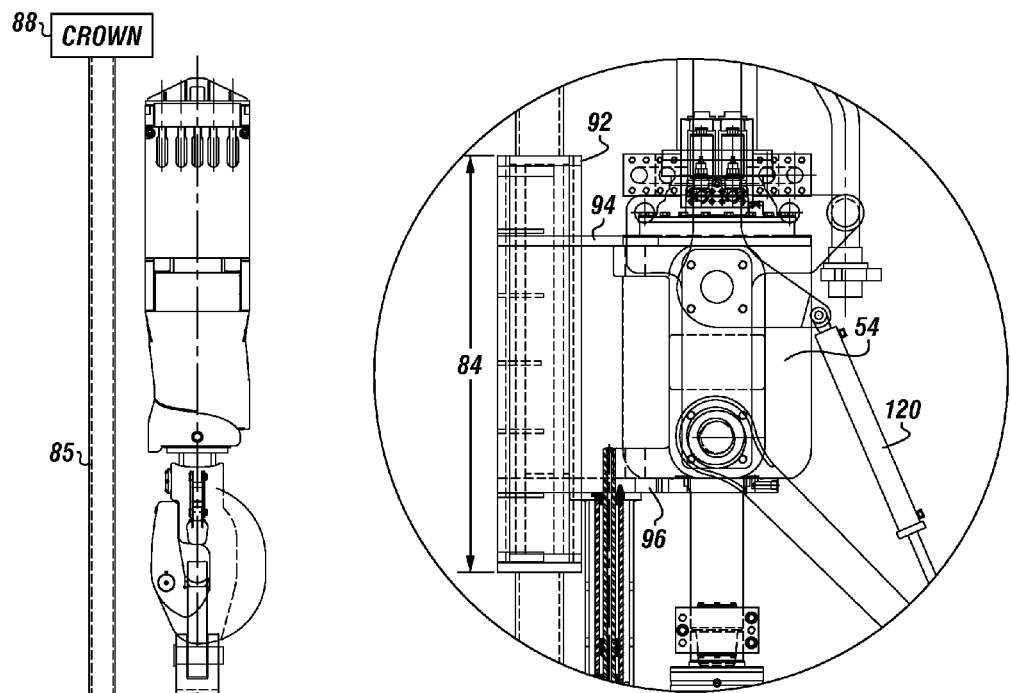
FIGURE 4B
FIGURE 4A

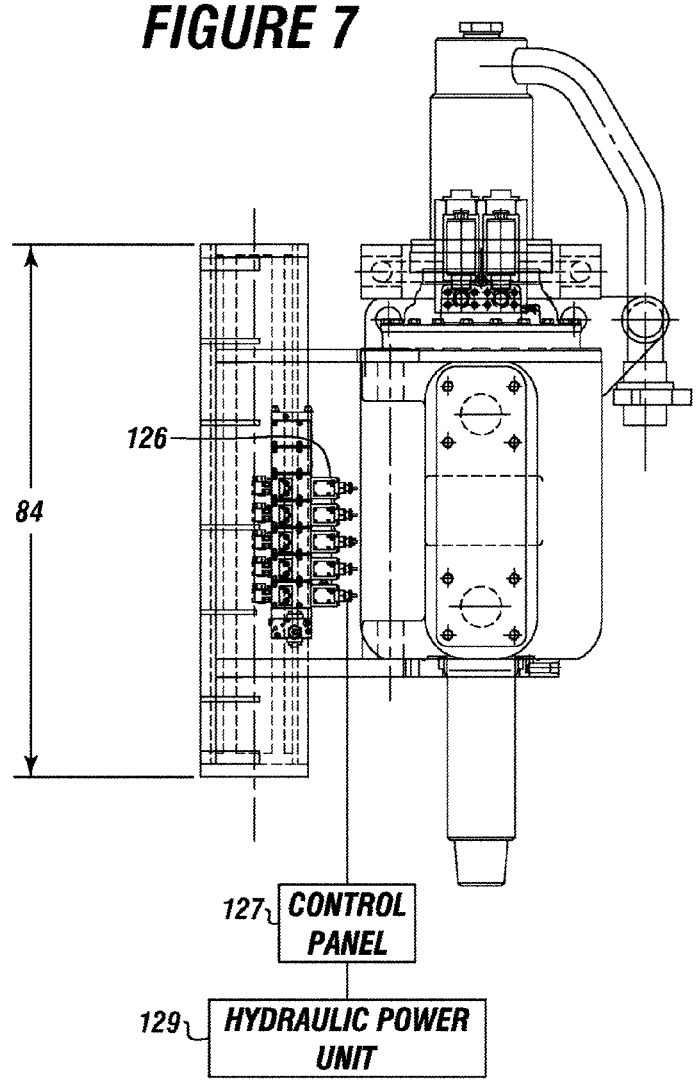

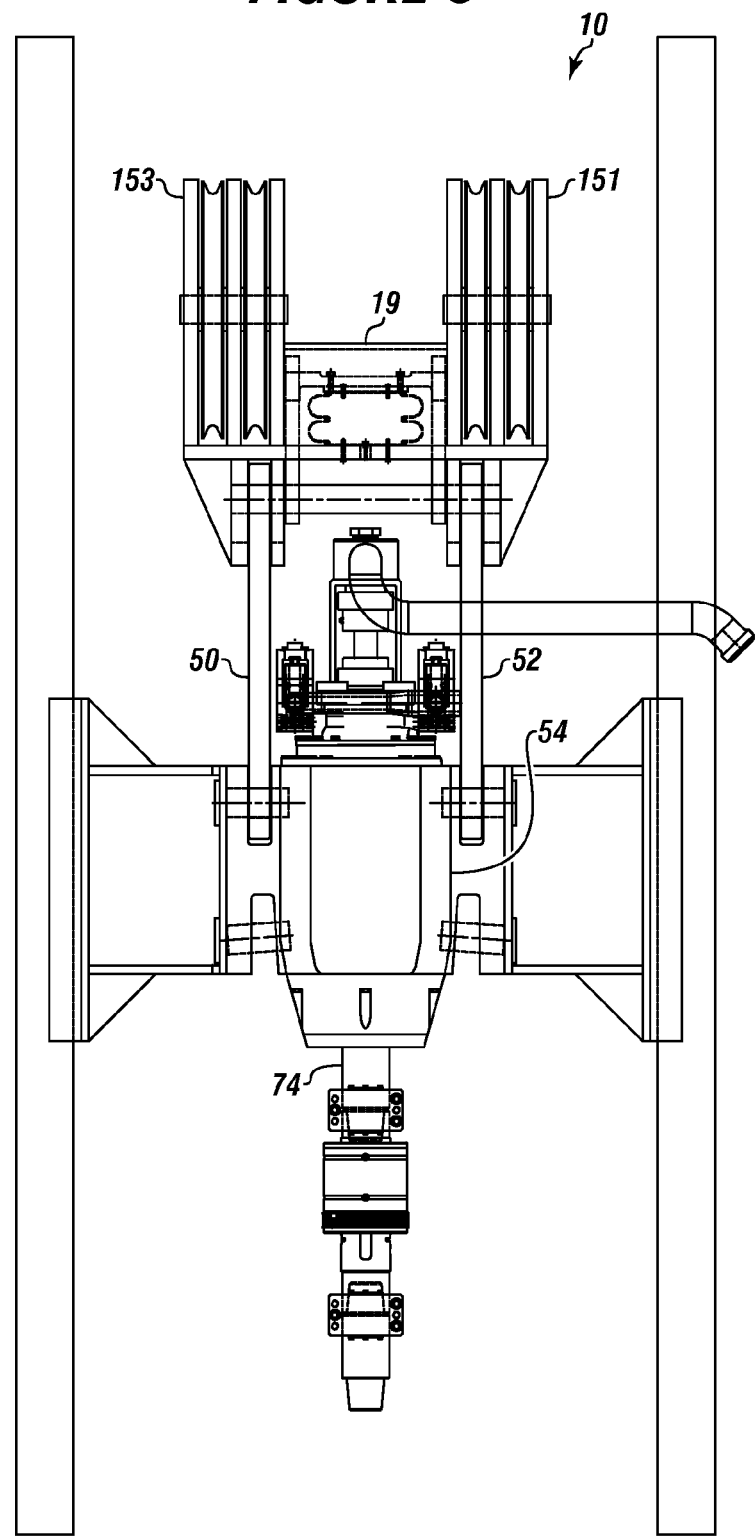

US 8,631,882 B1

DRILLING RIG WITH TORQUE MEASURING TOP DRIVE

CROSS REFERENCE TO RELATED APPLICATIONS

The present application is a continuation in part of co-pending U.S. Utility patent application Ser. No. 13/301,520 filed on Nov. 21, 2011, entitled "TORQUE MEASURING TOP DRIVE," which claims priority to U.S. Provisional Patent Application Ser. No. 61/420,672, filed on Dec. 7, 2010, entitled "TORQUE MEASURING TOP DRIVE". These references are hereby incorporated in their entirety herein.

FIELD

The present embodiments generally relate to a drilling rig for operating equipment that moves pipe into a wellbore having a top drive and a strain gauge load cell having two pins, a hinge pin and a torque measuring pin.

BACKGROUND

A need exists for a drilling rig with a top drive and a strain gauge load cell that can be calibrated, eliminating or reducing inaccuracies associated with determining load on conventional top drives used for drilling wells.

The present embodiments meet these needs.

BRIEF DESCRIPTION OF THE DRAWINGS

The detailed description will be better understood in conjunction with the accompanying drawings as follows:

FIG. 4A depicts a top drive with a torque wrench assembly and a kick out elevator link that uses the strain gauge load cell according to one or more embodiments.

FIG. 4B is a detail of a portion of FIG. 4A.

FIG. 7 depicts a detailed view of a torque slide assembly used with a top drive.

FIG. 8 depicts a pneumatic thread compensator and two sheaves instead of a lifting block.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that they can be practiced or carried out in various ways.

The present embodiments relates to a drilling rig, such as an oil rig with a derrick or a tower, for drilling a wellbore.

Figure 1:
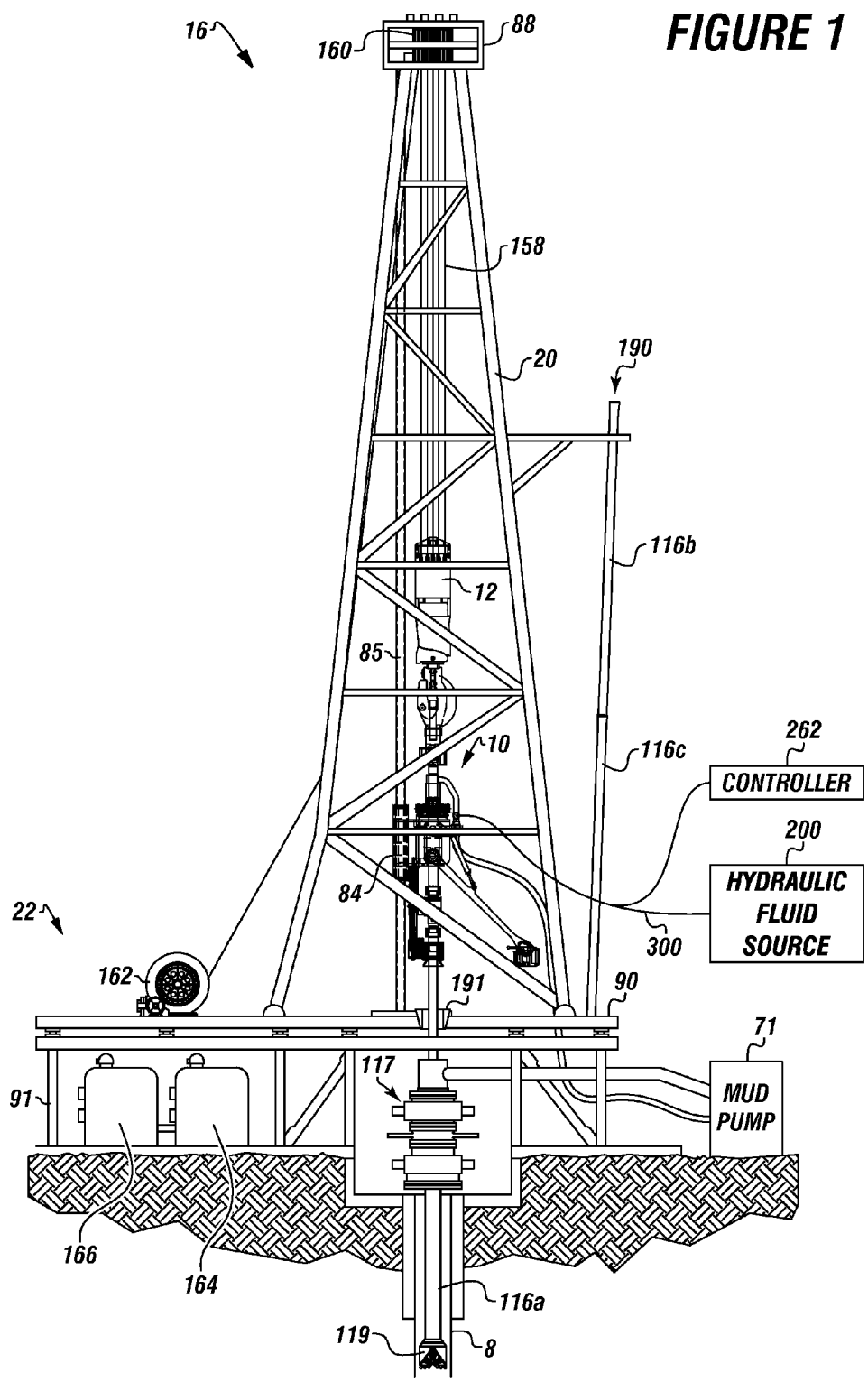
FIG. 1 depicts a drilling rig with top drive according to one or more embodiments.

Turning now to the Figures, FIG. 1 shows a drilling rig 16 for use in drilling wells made of a derrick 20 having a crown 88 at an end of the derrick 20 and a drilling rig base 22 with a drilling rig floor 90.

A torque track slide assembly 84 slides over a modular torque track assembly 15. The modular torque track assembly 15 between the crown 88 of the derrick 20 and the drilling rig base 22 with drilling rig floor 90.

The drilling rig base 22 shows the drilling rig floor 90 connected to a drilling rig floor substructure 91.

The drilling rig has a lifting block 12 that is secured to a cable 158. The cable 158 can extend from the lifting block 12 over at least one sheave 160 mounted to the top of the derrick 20 at the crown 88.

The drawworks 162 can be connected to a drawworks motor 164 for turning the drawworks 162, and for raising or lowering the lifting block 12.

The drawworks motor can be energized from a power supply 166 such as a hydraulic power supply. The drawworks motor can be used to turn the drawworks and raise or lower the top drive with the cable.

A top drive 10 can slidingly engage the modular torque track 85 by attaching to the torque track slide assembly 84. The top drive 10 can include a mud pump 71.

A pipe 116a can be engaged with the drilling rig 16 at one end and with a drill bit 119 on the other end within the wellbore 8.

A stand of pipes, including pipe 116c connected to pipe 116b can be maintained in a racking position 190 relative to the drilling rig floor 90.

A blowout preventer (BOP) stack 117 is shown positioned over the wellbore 8 with the pipe 116a passing through the blowout preventer (BOP) stack 117.

A hydraulic fluid source 200 for powering the top drive 10 is shown. The hydraulic fluid passes through a conduit 300. Slips 191 are also shown at the top of the wellbore 8. The top drive 10 can be in communication with a controller 262, which is described in more detail in FIG. 6C.

The lifting block 12 can have a hook and can be secured to a cable 158 and to a the crown 88 of the derrick for hoisting up and lowering down the top drive as needed to rotate the pipe holding a drill bit.

The cable 158 can extend from the lifting block 12 over at least one sheave mounted to the top of the derrick adjacent the crown and can be used with the drawworks to raise or lower the top drive.

Figure 2:
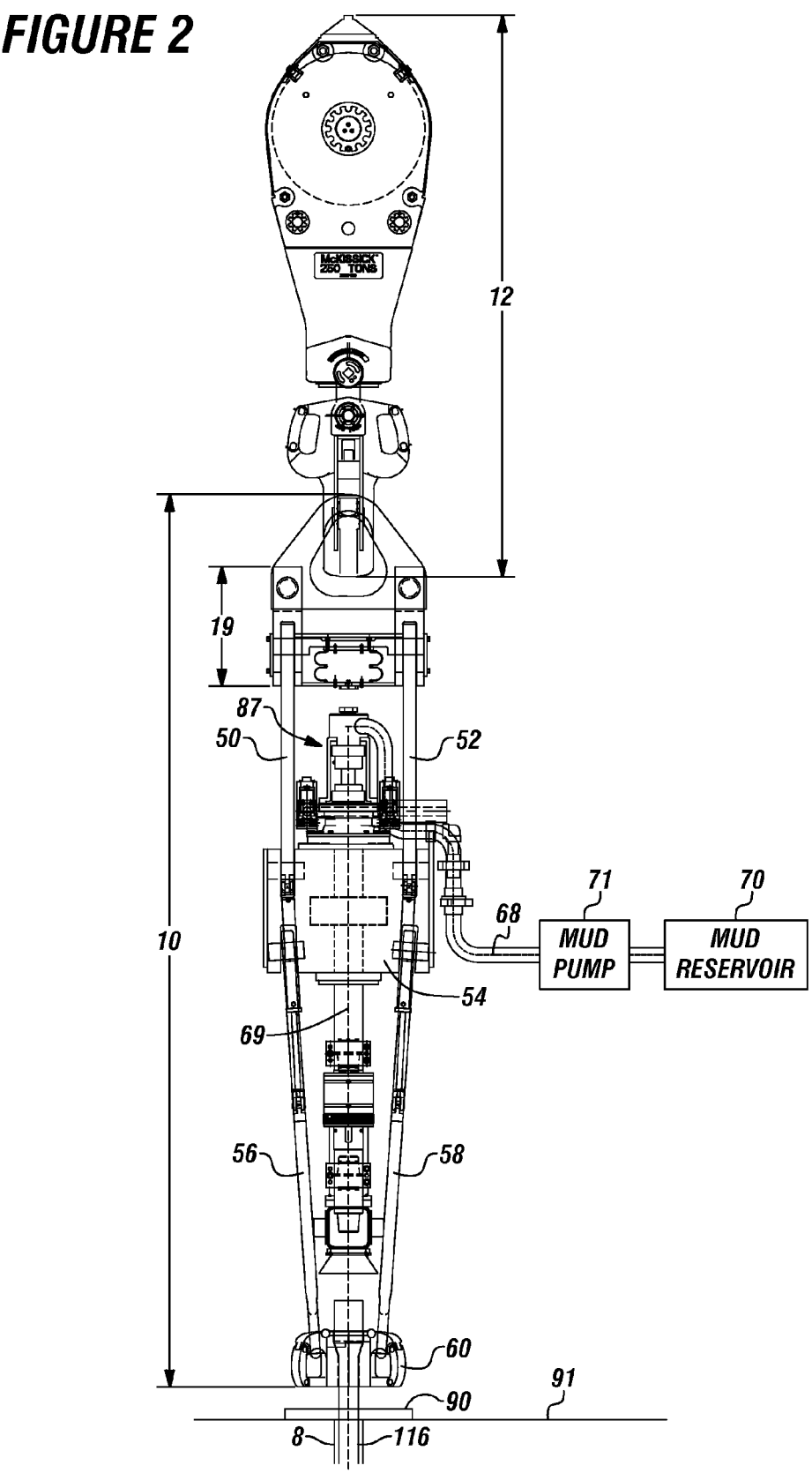
FIG. 2 depicts a top drive according to one or more embodiments.

FIG. 2 depicts a side view of an embodiment of a top drive 10 engaged with a lifting block 12.

The lifting block 12 can be in connection with a top drive housing 54 that contains the top drive 10. The torque track slide assembly, shown in FIG. 1, can also connect to the top drive housing 54 of a top drive 10 contained within the housing.

The top drive housing 54 can support the top drive 10 for connection to the cable 158, shown in FIG. 1. The top drive housing 54 can be made from steel and can be configured to support a rotating stem, also referred to as a main shaft, which can be mounted therein.

The top drive 10 can include a pneumatic thread compensator 19, a first upper link 50, a second upper link 52, a top drive housing 54 connected to both upper links 50 and 52, a first lower link 56 and a second lower link 58 connected to the top drive housing 54, and an elevator 60 connected to both lower links 56 and 58.

In one or more embodiments, the first lower link can be connected or pinned to the top drive housing, and a second lower link can be connected or pinned to the top drive housing opposite the first lower link.

The lower links can extend from the top drive housing and can be connected to an elevator, which can be a manual or hydraulic elevator. The top drive can include at least one elevator hydraulic cylinder that can be used to kick out the elevator to grab a pipe or a stand of pipes from a pipe rack, a V-door, a mouse hole, or another location.

The top drive 10 can be used for engaging a pipe or a stand of pipes, such as pipe 116, which can be a drill pipe extending from a drilling rig floor 90, through a drilling rig floor substructure 91, and into a wellbore 8.

The top drive 10 can include a mud pump 71 in fluid communication with a mud reservoir 70 for pumping a pressurized mud 68 to a wash pipe packing seal assembly 87.

The wash pipe packing seal assembly 87 can be connected to the top drive housing 54. The pressurized mud 68 can flow along a central mud flow path 69, to a drill bit that can be connected to the pipe 116.

Figure 3A:
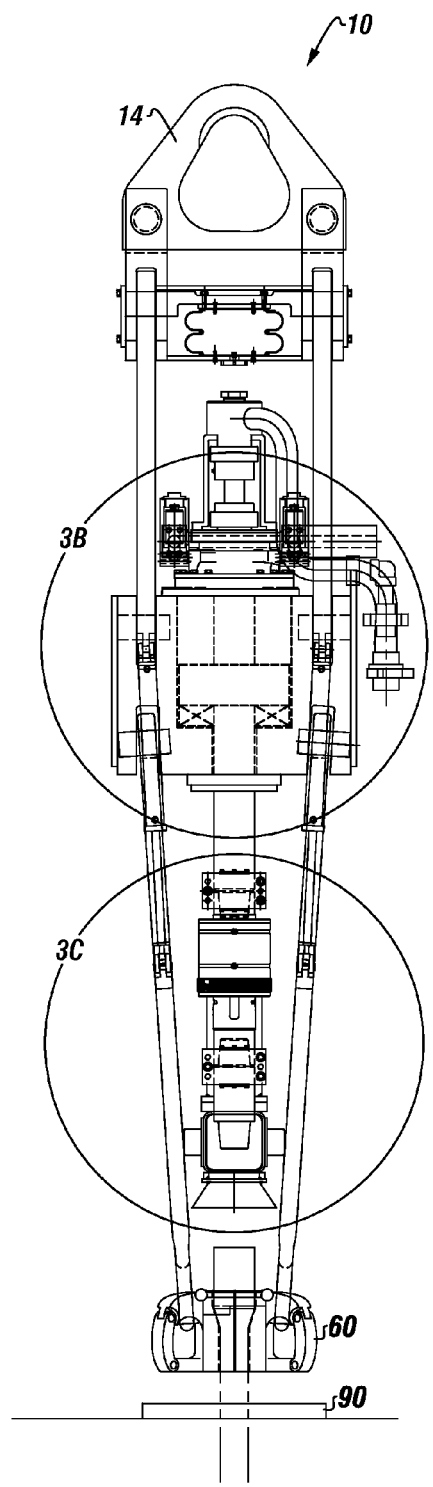
FIG. 3A depicts a first detailed view of portions of a top drive.

FIG. 3A depicts a view of a torque measuring portion of the top drive 10.

The top drive 10 can include or be connected to a bail 14. The bail 14 can be engaged with the lifting block.

Also shown are the elevator 60 and the drilling rig floor 90.

Figure 3B:
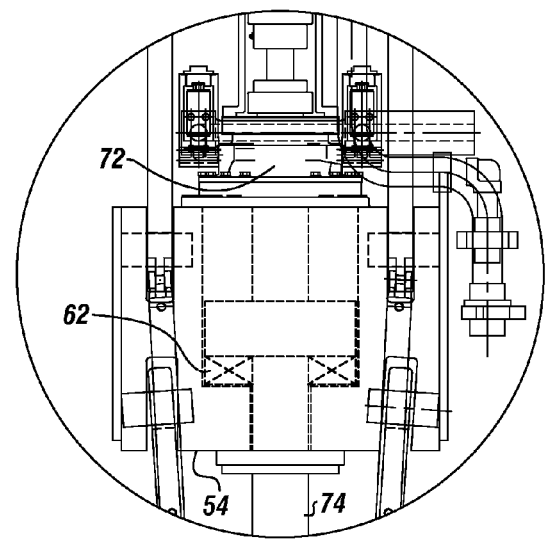
FIG. 3B depicts a second detailed view of portions of the top drive.

FIG. 3B depicts a second detailed view of portions of the top drive.

The top drive housing 54 can support a rotating stem 74, which can be mounted therein.

The rotating stem 74 can be spinably connected with a motor 72. The motor 72 can be connected with the top drive housing 54. The motor can be a hydraulic motor. In one or more embodiments, the motor can at least partially extend into the top drive housing.

A heavy thrust bearing 62 can be disposed about the rotating stem 74 within the top drive housing 54.

Figure 3C:
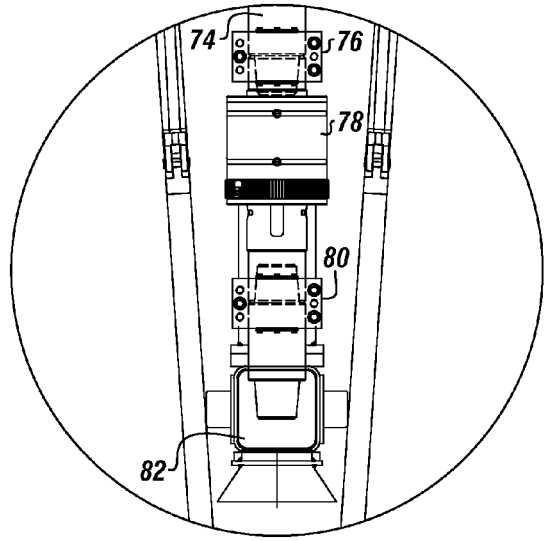
FIG. 3C depicts a third detailed view of portions of the top drive.

FIG. 3C depicts a third detailed view of portions of the top drive

An inside blowout preventer 78 can be connected to the rotating stem 74 and to a saver sub 82. The inside blowout preventer can be connected to the rotating stem opposite from where the rotating stem is mounted to the top drive housing, such as to a bottom end of the rotating stem.

An upper clamp assembly 76 can be disposed about and can lock the connection between the rotating stem 74 and the inside blowout preventer 78. The upper clamp assembly can lock the connection between the rotating stem and the inside blowout preventer.

A lower clamp assembly 80 can be disposed about and can lock the connection between the inside blowout preventer 78 and the saver sub 82. The lower clamp assembly, which can be the same type of clamp as the upper clamp assembly, can lock the connection between the inside blowout preventer and the saver sub.

In one or more embodiments, each clamp assembly can include one or more tong dies for preventing backing out or breaking off of any tool joint connections in the top drive, such as threaded connections between pipes.

FIG. 4A depicts details of portions of the top drive. The top drive can include a torque wrench assembly 86 that can be connected to the top drive housing 54 (shown in FIG. 4B) and/or a torque track slide assembly 84 (also shown in FIG. 4B).

In one or more embodiments, the torque wrench assembly can include a pair of torque supporting telescoping rectangular tubes for supporting a torque load with telescoping movement. The torque wrench assembly can include a hydraulic cylinder with a first end, a second end, and a single hollow cylinder rod disposed therethrough.

The hydraulic cylinder can be disposed inside the torque supporting telescoping rectangular tubes. The single hollow cylinder rod can be moveably positionable within the hydraulic cylinder, such that the single hollow cylinder rod can moveably extend out of the first end and the second end of the hydraulic cylinder.

The torque track slide assembly 84 can be configured to slide on a modular torque track 85. The modular torque track 85 can be suspended from a crown 88 of a derrick, and can be connected to the drilling rig floor 90 and/or to the drilling rig floor substructure 91. The torque track slide assembly, the top drive housing, the top plate, and the bottom plate can provide protection from external forces to the area therein.

In one or more embodiments, the modular torque track can be hanging loosely and can be only slightly tensioned, such that no torque loads are imparted onto the derrick. The modular torque track can be suspended from the crown of the derrick or the drilling rig.

The torque track slide assembly can include a body, also referred to as a slide body, a top plate engaged with the top drive housing, a bottom plate engaged with the top drive housing, and a torque assembly door. The torque assembly door can be a rotatable slide door that can be engaged around a rectangular torque reaction tube. The rotatable slide door can provide for easy installation and removal of the rectangular torque reaction tube.

The top drive can include an elevator hydraulic cylinder 120 (shown in FIG. 4B) connected to the elevator 60 and to the top drive housing 54 (shown in FIG. 4B) for kicking out the elevator 60 with the lower links, such as the lower link 56, to grab pipes.

FIG. 4B shows the top drive housing 54 and a torque track slide assembly 84.

The torque track slide assembly 84 can include a slide body 92, a top plate 94 engaged with the top drive housing 54, and a bottom plate 96 engaged with the top drive housing 54.

Figure 5:
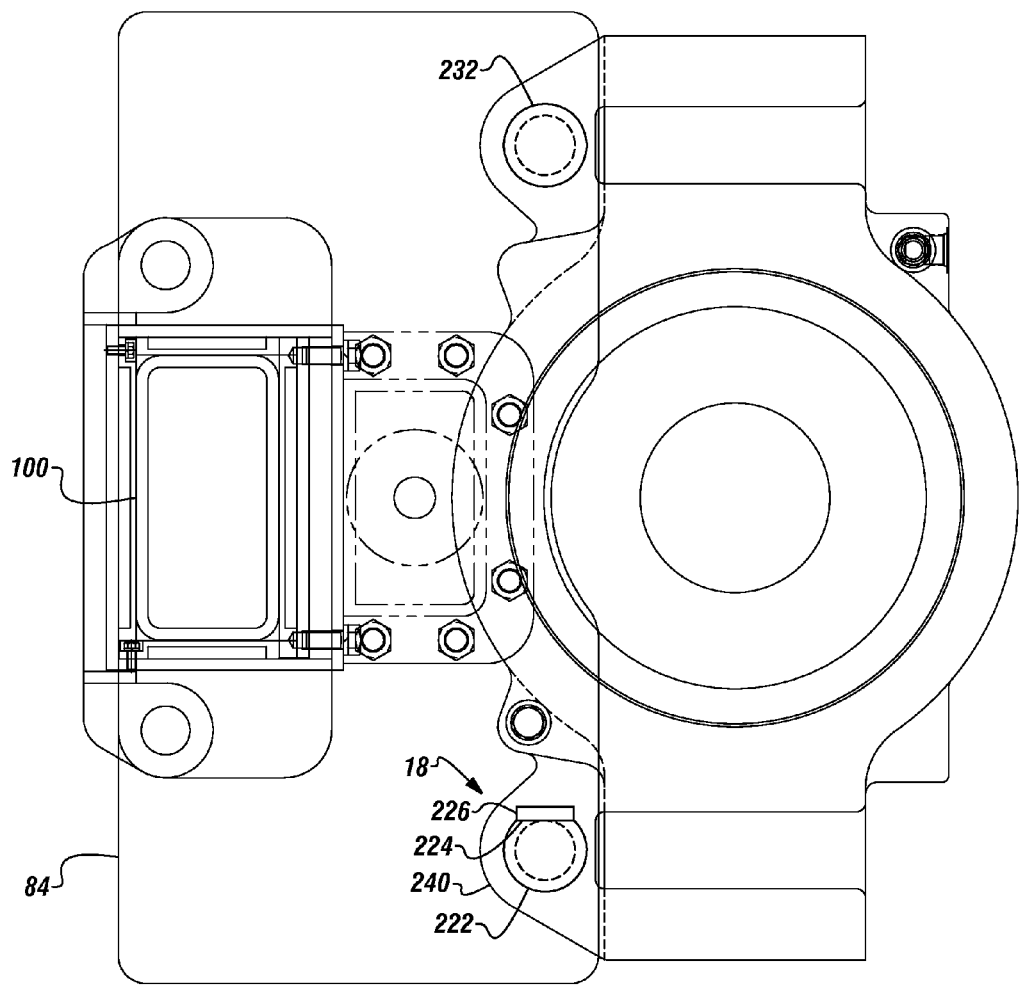
FIG. 5 depicts a top view of a torque track slide assembly with the strain gauge load cell.

FIG. 5 depicts a top view of the torque track slide assembly 84 with the strain gauge load cell 18. A rectangular torque reaction tube 100 is shown.

A first boss 240 is depicted, along with a torque measuring pin head 222, a pin flat side 224, and a flat fixed surface 226. The pin flat side 224 can be for orientation against the flat fixed surface 226 of the first plate. A hinge pin 232 is also shown.

The first boss can be connected to the top drive housing to hold and contain a segment of the torque measuring pin.

The first boss can have a first bore with a first bore diameter to allow the torque measuring pin to pass through the first bore without touching the first bore. A segment of the torque measuring pin body can be surrounded by the first boss.

The torque measuring pin can engage through the first boss or the first bore without engaging the first bore or the first boss. The first boss can be configured to restrain vertical movement between the first plate and the second plate when torque is applied to the top drive.

Figure 6A:
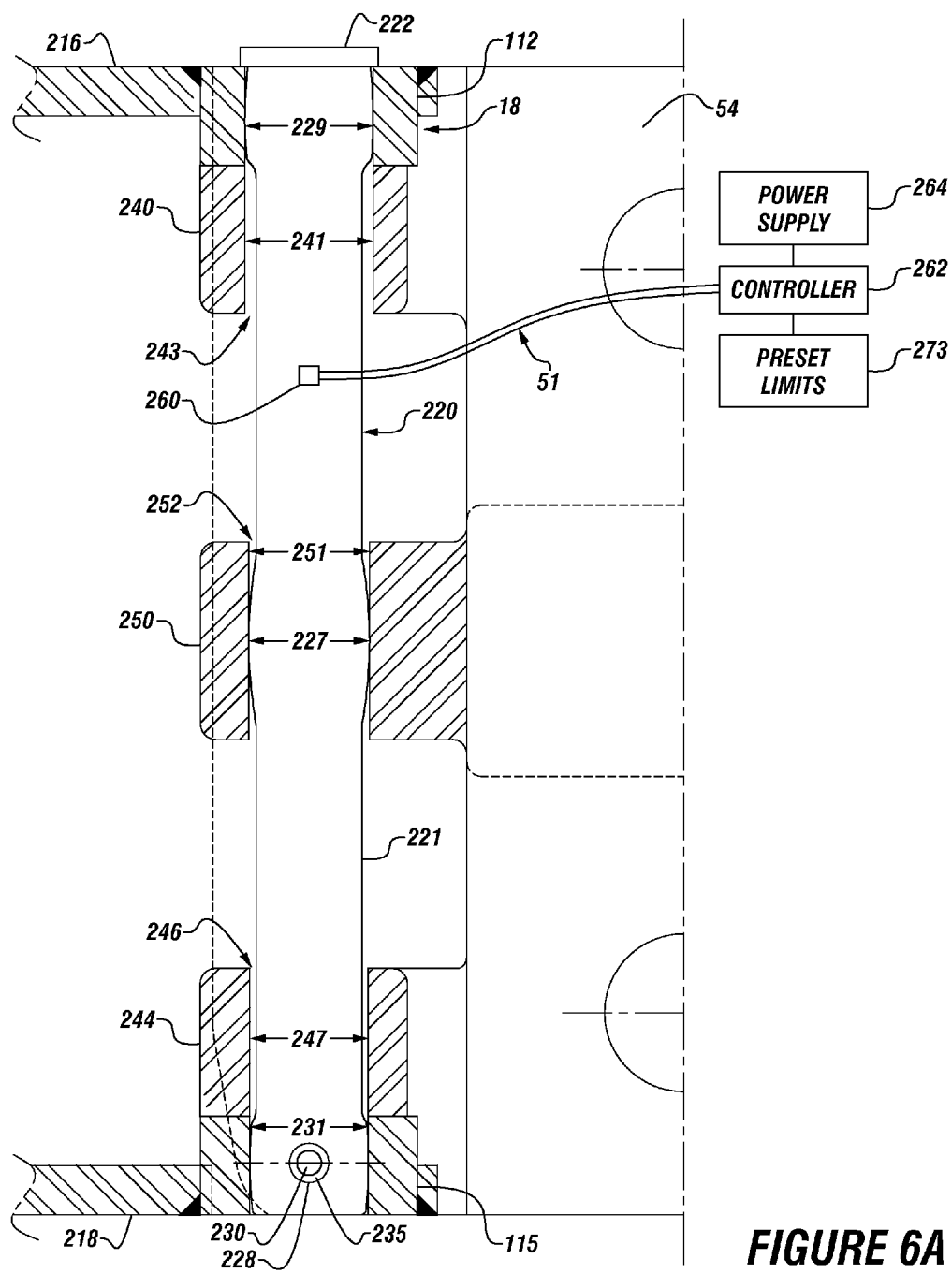
FIG. 6A depicts a cut side view detail of the strain gauge load cell.

FIG. 6A depicts a cut side view detail of the strain gauge load cell 18.

In one or more embodiments, the strain gauge load cell can be attached to a top drive housing of the top drive. The strain gauge load cell can include a first plate 216 opposite a second plate 218 mounted to the top drive housing.

The strain gauge load cell 18 can include a hinge pin, which can have a constant diameter. The hinge pin can have a hinge pin head and a hinge pin body for securing the torque slide assembly of the top drive to the top drive housing. The hinge pin can engage with the first plate, the torque slide assembly, and the second plate for securing the torque slide assembly of the top drive to the top drive housing.

A torque measuring pin 220 with a torque measuring pin head 222, a torque measuring pin body 221, a first pin diameter 227, a second pin diameter 229, and a third pin diameter 231, is depicted engaged with both the first plate 216 and the second plate 218. The three diameters of the torque measuring pin 220 can be used for ease of installation.

The torque measuring pin 220 can be made from steel, a heat treated steel, a durable alloy, or combinations thereof. The torque measuring pin 220 can have a length that is configured to span from the first plate 216 to the second plate 218 for engagement thereto.

The torque measuring pin head 222 can have a diameter that is slightly greater than the first pin diameter 227.

The torque measuring pin 220 can secure the torque track slide assembly to the top drive housing 54.

The torque measuring pin body 221 can have a torque measuring pin hole 228 for engaging a first restraining member 230. The torque measuring pin hole 228 can include a flexible bushing 235 to centralize the first restraining member 230 in the torque measuring pin hole 228, and to hold the torque measuring pin head 222 above the first plate 216, thereby preventing dragging of the torque measuring pin head 222 when the torque measuring pin body 221 bends, which can affect the accuracy of torque measurements.

The torque measuring pin can have a pin head flat side for orientation against a fixed surface of the first plate, providing for a smooth engagement between the torque measuring pin and the first plate.

The torque measuring pin can engage with the first plate, the torque slide assembly of the top drive, and the second plate for securing the torque slide assembly to the top drive housing.

A first boss 240 can be formed between the first plate 216 and the second plate 218 to restrain vertical movement between the first plate 216 and the second plate 218.

The first boss 240 can have a first bore 243 with a first bore diameter 241 that can be larger than the second pin diameter 229, enabling the torque measuring pin body 221 to easily drop into position. The first boss 240 can be positioned proximate to the first plate 216.

A second boss 244 can be formed and positioned near the second plate 218 to restrain axial movement between the first plate 216 and the second plate 218. The torque measuring pin 220 can be inserted into the second boss 244. The second boss 244 can have a second bore 246 aligned with the first bore 243.

The second bore 246 can have a second bore diameter 247. The second bore diameter 247 can be large enough to clear deflection of the torque measuring pin body 221.

The second bore diameter can be configured to allow deflection of the torque measuring pin body without engaging the torque measuring pin body. The second bore diameter can allow the torque measuring pin to pass through the second bore without touching the second bore. The second boss can surround a segment of the torque measuring pin body.

The segment of the torque measuring pin body that can be surrounded by the second boss can be located opposite from the segment of the torque measuring pin body surrounded by the first boss.

The torque measuring pin can engage through the second boss or the second bore without engaging the second boss or the second bore. The second boss can be configured to restrain axial movement between the first plate and the second plate when torque is applied to the top drive.

A third boss 250 with a third bore 252 can have a third bore diameter 251 that can be equal to the first pin diameter 227 to snugly engage the torque measuring pin body 221 and allow the torque measuring pin 220 to bend when torque is applied simultaneously by the first plate 216 and the second plate 218. As such, the third boss 250 can react to the applied torque. For example, the third bore diameter can be equal to a diameter of the torque measuring pin proximate the third bore, allowing the torque measuring pin to bend when torque is applied to the torque measuring pin simultaneously by the first plate and the second plate, and allowing the third boss to react to the applied torque.

A top bushing 112 can connect to the first plate 216. A bottom bushing 115 can connect to the second plate 218. The top bushing 112 can be larger in diameter than the bottom bushing 115, such as from about 1 percent to about 10 percent larger.

A strain gauge load cell sensor 260 can be connected to the torque measuring pin body 221 between the first boss 240 and the third boss 250 with a specific orientation to receive bending information.

The strain gauge load cell sensor can be connected to or otherwise engaged with the torque measuring pin. An illustrative strain gauge load cell sensor can be one made by Dynasen of Goleta, Calif. The strain gauge load cell sensor can measure strain or torque from the torque measuring pin and can produce signals therefrom.

A controller 262 can be connected to the strain gauge load cell sensor 260 to receive signals over wires 51 from the strain gauge load cell sensor 260.

The controller 262 can be connected to a power supply 264 for detecting measurable bending of the torque measuring pin body 221, which can be calibrated in torque for detecting forward and reverse bending of the torque measuring pin body 221.

The controller 262 can transmit determined torque strain and compliance with preset limits 273 for use in operation of the top drive.

The controller, which can be an electronic controller, can be connected to or otherwise engaged with the strain gauge load cell sensor. The controller can be in communication with the strain gauge load cell sensor for receiving the produced signals from the strain gauge load cell sensor. For example, the controller can be connected to the strain gauge load cell sensor with wires or through a wireless communication.

The controller can be in communication with a power supply. The power supply can be one or more batteries or a 110 volt power source. The controller can include a processor with a data storage. Computer instructions for calibrating can be stored in the data storage.

The controller can use the signals from the strain gauge load cell sensor to detect measurable pin body movement or bending of the torque measuring pin. The detected measurable pin body movement or bending can be calibrated in torque for detecting forward and reverse bending of the torque measuring pin body.

In one or more embodiments, the processor of the controller can be configured to execute computer instructions in the data storage to compare received signals of the measured torque sensed by the strain gauge load cell sensor to preset limits stored in the data storage. As such, the controller can determine torque strain on the top drive continuously during operational use of the top drive, can determine whether or not the measured torque is within preset limits, and can transmit the determined torque strain and compliance with preset limits to users for use in operation of the top drive. For example, the preset limits can be an amount of torque above which the top drive should not be operated at, an amount of torque below which the top drive should not be operated, or combinations thereof.

Figure 6B:
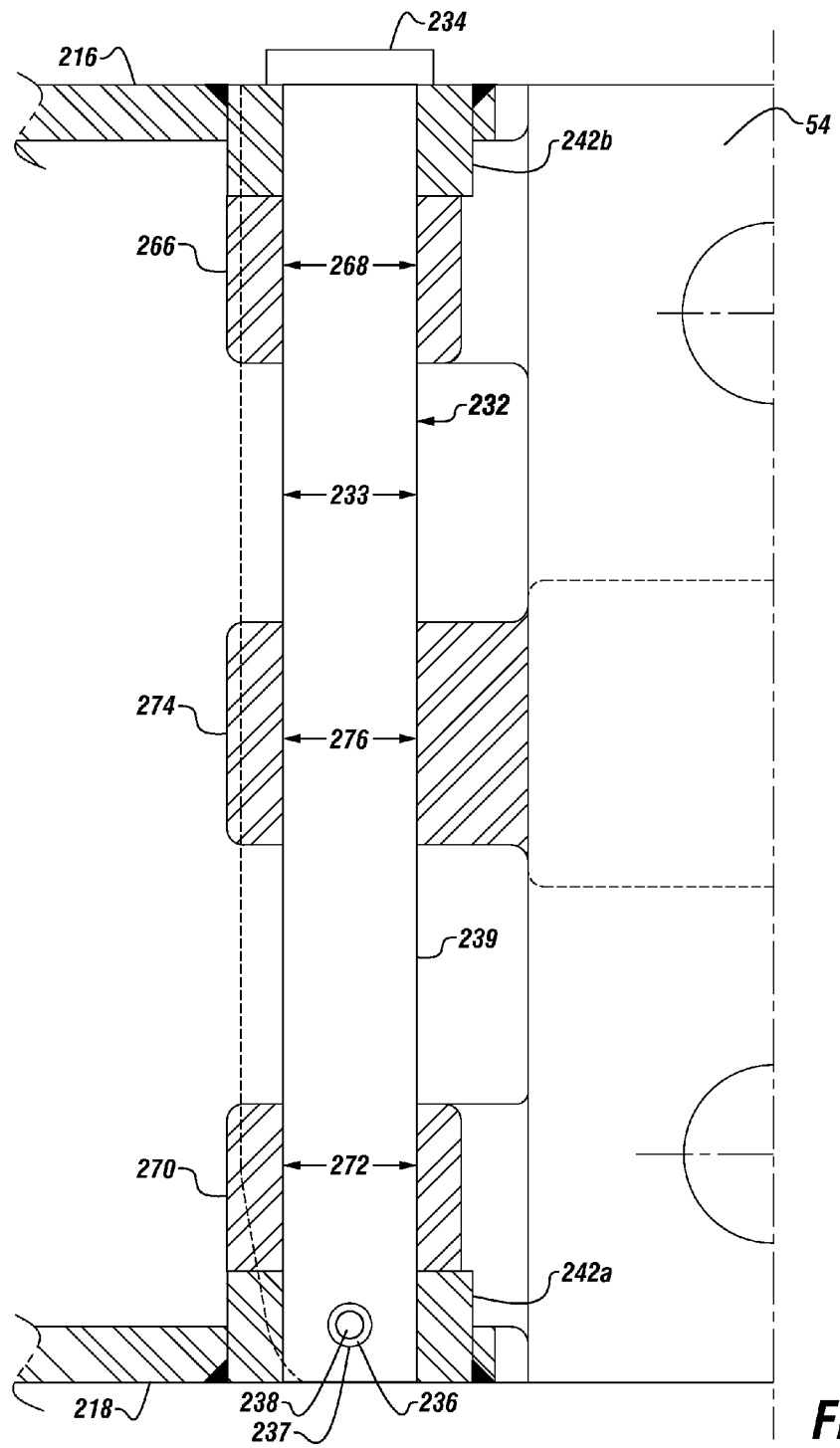
FIG. 6B depicts a cut view of a hinge pin according to one or more embodiments.

FIG. 6B depicts a cut side view detail of the hinge pin 232 according to one or more embodiments. The hinge pin 232 can have a hinge pin head 234, a hinge pin body 239, and a constant diameter 233.

The hinge pin 232, including the hinge pin head 234 and the hinge pin body 239, can engage with the first plate 216 and the second plate 218. The hinge pin 232 can secure the torque slide assembly to the top drive housing 54.

The hinge pin 232 can have a second pin hole 237, a second restraining member 238, and a second flexible bushing 236.

In embodiments, the hinge pin body can include a second pin hole for engaging a second restraining member. Each pin hole can range in diameter from about one-quarter of an inch to about three inches, depending upon the size of the top drive.

A fourth boss 266 with a fourth boss bore diameter 268 can receive the hinge pin 232 in a snug fit engagement.

The fourth boss can be parallel with the first boss and connected to the top drive housing. The fourth boss can have a fourth bore with a fourth bore diameter to receive the hinge pin body in a close alignment. The hinge pin can engage through the fourth boss to hinge the first plate and the second plate to the top drive housing.

A fifth boss 270 with a fifth boss bore diameter 272 can receive the hinge pin body 239 in a snug fit engagement.

The fifth boss can be connected to the top drive housing in parallel with the second boss. The fifth boss can have a fifth bore with a fifth bore diameter to receive the hinge pin body in a close alignment. The hinge pin can engage through the fifth boss to hinge the first plate and the second plate to the top drive housing.

A sixth boss 274 with a sixth boss bore diameter 276 can receive the hinge pin body 239 in a snug and secure engagement.

The sixth boss can be connected to the top drive housing in parallel with the third boss. The sixth boss can have a sixth bore with a sixth bore diameter to receive the hinge pin body in a close alignment. The hinge pin can engage through the sixth boss to hinge the first plate and the second plate to the top drive housing.

In one or more embodiments, the fourth boss, the fifth boss, and the sixth boss can have equal diameters.

The fourth boss bore diameter 268, the fifth boss bore diameter 272, and the sixth boss bore diameter 276 can be equal.

Third bushings 242a and 242b can also have identical diameters.

Figure 6C:
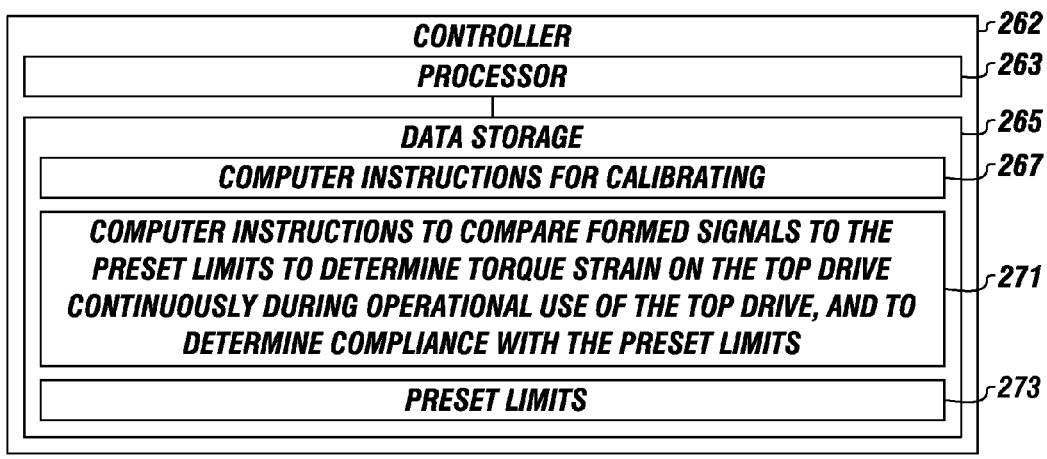
FIG. 6C depicts an embodiment of a controller.

FIG. 6C depicts an embodiment of the controller 262, which can measure strain determined by the strain gauge load cell sensor, and can calibrate the strain to a torque, such as in foot pounds.

The controller 262 can include a processor 263 with a data storage 265. The data storage 265 can include computer instructions for calibrating 267. The data storage 265 can include preset limits 273 stored therein.

The data storage 265 can also include computer instructions to compare formed signals to the preset limits to determine torque strain on the top drive continuously during operational use of the top drive, and to determine compliance with the preset limits 271.

The processor 263 can be configured to execute the computer instructions stored within the data storage 265.

FIG. 7 depicts a view of a portion of the top drive. One or more solenoid valves 126 can be mounted to the torque track slide assembly 84. The solenoid valves 126 can be connected to a control panel 127 for operating the top drive.

A hydraulic power unit 129 can be in communication with the control panel 127 for powering the top drive.

FIG. 8 describes an embodiment of the apparatus with the lifting block being replaced with a pneumatic thread compensator 19 and two sheaves. The lifting block can be a first sheave 151 opposite a second sheave 153. Connecting the sheaves is the pneumatic thread compensator 19. Attached to the pneumatic thread compensator are the first upper link 50 and the second upper link 52 to which the top drive housing 54 is attached.

Also shown is the top drive 10 mounted in the top drive housing 54, wherein the top drive 10 supports the rotating stem 74.

While these embodiments have been described with emphasis on the embodiments, it should be understood that within the scope of the appended claims, the embodiments might be practiced other than as specifically described herein.

What is claimed is:

1. A drilling rig for rotating a pipe with a drill bit in a wellbore, comprising:
   a. a derrick centered over the wellbore, wherein the derrick has a crown and the derrick is attached to a drilling rig base;
   b. cables mounted to at least one sheave to the top of the derrick at the crown;
   c. a lifting block connected to the cables, wherein the lifting block comprises a first sheave mounted on one side of the lifting block and a second sheave mounted to an opposite side of the lifting block with a pneumatic thread compensator disposed between the first sheave and the second sheave;
   d. a drawworks connected to a drawworks motor for raising or lowering the lifting block;
   e. a top drive housing mounted to the lifting block;
   f. a top drive mounted in the top drive housing, wherein the top drive supports a rotating stem spinably connected with a motor, a thrust bearing disposed about the rotating stem within the top drive housing, an inside blowout preventer connected to the rotating stem and to a saver sub; an upper clamp assembly locking the connection between the rotating stem and the inside blowout preventer, a lower clamp assembly locking the connection between the inside blowout preventer and the saver sub;
   g. a blowout preventer (BOP) stack positioned over the wellbore with the pipe passing through the blowout preventer (BOP) stack;
   h. a mud pump connected to the pipe for use while the drill bit rotates;
   i. a power supply for powering the drawworks motor;
   j. a controller in communication with the top drive, pneumatic thread compensator, the mud pump, a hydraulic fluid source, and the drawworks motor;
   k. a pair of slips disposed on top of the wellbore between the blowout preventer (BOP) stack and the drill bit;
   l. a strain gauge load cell mounted to a torque track slide assembly that slides over a modular torque track assembly between the crown of the derrick and the drilling rig floor, wherein the strain gauge load cell comprises a first plate mounted to the top drive housing and a second plate mounted to the top drive housing opposite the first plate, and further comprising:

(i) a torque measuring pin comprising a pin head and a pin body, wherein the torque measuring pin engages the torque track slide assembly of the top drive;

(ii) a hinge pin comprising a hinge pin head and a hinge pin body, wherein the hinge pin engages with the torque track slide assembly and the second plate, securing the torque track slide assembly to the top drive housing;

(iii) a first boss having a first bore with a first bore diameter, wherein the torque measuring pin engages through the first bore without engaging the first bore, and wherein the first boss is configured to restrain vertical movement between the first plate and the second plate when torque is applied to the top drive;

(iv) a second boss having a second bore with a second bore diameter, wherein the second bore is axially aligned with the first bore, and wherein the torque measuring pin engages through the second bore without engaging the second bore, and wherein the second boss is configured to restrain axial movement between the first plate and the second plate when torque is applied to the top drive;

(v) a third boss between the first boss and the second boss, wherein the third boss has a third bore with a third bore diameter, wherein the third bore is axially aligned with the first bore and the second bore, wherein the torque measuring pin engages through the third boss, and wherein the third bore is configured to engage the torque measuring pin body to bend the torque measuring pin when torque is applied to the top drive;

(vi) a fourth boss connected to the top drive housing in parallel with the first boss, wherein the fourth boss has a fourth bore with a fourth bore diameter, wherein the hinge pin engages through the fourth boss to hinge the first plate and the second plate to the top drive housing;

(vii) a fifth boss connected to the top drive housing in parallel with the second boss, wherein the fifth boss has a fifth bore with a fifth bore diameter, wherein the hinge pin engages through the fifth boss to hinge the first plate and the second plate to the top drive housing; and (viii) a sixth boss connected to the top drive housing in parallel with the third boss, wherein the sixth boss has a sixth bore with a sixth bore diameter, wherein the hinge pin engages through the sixth boss to hinge the first plate and the second plate to the top drive housing; and m. a strain gauge load cell sensor engaged with the torque measuring pin for measuring strain on the torque measuring pin to form signals; and wherein the controller additionally communicates with the strain gauge load cell sensor for receiving the formed signals.

2. The drilling rig of claim 1, further comprising:

a. a first pin hole in the pin body for engaging a first restraining member;

b. a flexible bushing in the first pin hole to centralize the first restraining member in the first pin hole and to hold the pin head above the first plate preventing dragging of the pin head when the pin body bends, thereby ensuring accuracy of torque measurements; and c. a second pin hole in the hinge pin body for engaging a second restraining member.

3. The drilling rig of claim 1, wherein the hinge pin has a constant diameter.

4. The drilling rig of claim 1, wherein the torque measuring pin is made of a metal alloy.

5. The drilling rig of claim 1, wherein the second bore diameter is configured to allow deflection of the torque measuring pin body without engaging the torque measuring pin body.

6. The drilling rig of claim 1, wherein the third bore diameter is equal to a diameter of the torque measuring pin proximate the third bore allowing the torque measuring pin to bend when torque is applied to the torque measuring pin simultaneously by the first plate and the second plate, and allowing the third boss to react to the applied torque.

7. The drilling rig of claim 1, wherein the controller is calibrated to detect forward and reverse bending of the torque measuring pin.

8. The drilling rig of claim 1, further comprising a top bushing connected to the first plate and a bottom bushing connected to the second plate, wherein the top bushing has a larger diameter than the bottom bushing.

9. The drilling rig of claim 1, wherein the controller comprises a processor with a data storage, computer instructions for calibrating in the data storage, and preset limits stored in the data storage.

10. The drilling rig of claim 9, wherein the processor is configured to execute the computer instructions in the data storage to compare the formed signals to the preset limits to determine torque strain on the drilling rig continuously during operational use of the drilling rig, and to determine compliance with the preset limits.

11. The drilling rig of claim 10, wherein the controller transmits the determined torque strain and compliance with preset limits to users for use in operation of the drilling rig.

* * * * *